INVENTOR
Harry Pelphrey
BY
Harness, Dickey & Pierce
ATTORNEYS

April 18, 1944.    H. PELPHREY    2,346,867
MACHINE FOR FORMING GEARS
Filed Oct. 29, 1940    4 Sheets-Sheet 4

INVENTOR
Harry Pelphrey.
BY
Harness, Dickey & Pierce
ATTORNEYS.

Patented Apr. 18, 1944

2,346,867

UNITED STATES PATENT OFFICE 2,346,867

MACHINE FOR FORMING GEARS

Harry Pelphrey, Detroit, Mich., assignor to Michigan Tool Company, Detroit, Mich., a corporation of Delaware Application October 29, 1940, Serial No. 363,331

16 Claims. (Cl. 90—10)

The present invention relates to machines for forming machine elements such as gears.

One of the primary objects of the present invention is to provide improved machines of the type mentioned by means of which all of the teeth of a gear may be simultaneously formed on a gear blank, thereby greatly increasing the speed of production of such gears.

Another object of the invention is to provide an improved cutterhead assembly for use on machines of the type mentioned whereby a plurality of circumferentially disposed cutters may be positively and accurately fed radially with respect to a gear blank to quickly form all of the teeth of the gear simultaneously.

A further object of the invention is to provide an improved cutterhead construction in which the cutters may be mounted therein in an improved manner.

A further object of the invention is to provide an improved construction whereby all of the teeth of a helical gear may be simultaneously formed in an improved manner.

Another object of the invention is to provide an improved construction in which a plurality of circumferentially spaced, radially disposed cutters and a work holder having a gear blank mounted thereon are reciprocated with respect to each other, and in which one of the reciprocating elements is guided on the helix of the teeth being cut.

Other objects of the invention will become apparent from the following specification, the drawings relating thereto, and the claims hereinafter set forth.

In the drawings, in which like numerals are used to designate like views throughout.

According to the present invention, a construction is provided in which a plurality of circumferentially spaced, radially disposed cutters are mounted in a cutterhead in surrounding relationship to a gear blank. Such gear blank is mounted upon a reciprocating plunger and upon upward movement of such plunger the gear blank is moved into cutting engagement with the cutters. The cutters are alternately fed radially inwardly and backed-off during the upward and downward strokes, respectively, of the gear blank, so that as the cutters are fed inwardly all of the gear teeth are formed simultaneously. The cutters are of such a shape that in the completed operation they remove entirely the interdental stock between the teeth formed thereby.

In the particular embodiment illustrated, the machine is designed for cutting helical gears, and in order to accomplish this the present invention contemplates the mounting of the cutters at an angle to the axis of reciprocation of the machine element or gear blank, and such gear blank is rotated with respect to its axis as it is reciprocated. In order to effect this, the reciprocating ram upon which the gear blank is mounted is caused to rotate upon the helix of the gear to be cut.

For a more detailed description of the invention, reference may be had to the drawings, in which a base or upright standard is generally indicated at 10. Such standard 10 has a machined vertical front surface 12 upon which a vertically adjustable mounting member or head stock element 14 is slidably mounted. Such member 14 is slidably mounted to the face 12 by means of vertically extending gibs, which are fixed to the face 12 and form ways which engage the vertical side edges of the member 14. The lower and rear end of member 14 is provided with a vertical opening 16 therethrough, through which a vertical screw 18 extends. A bearing nut 20 threadably engages the screw 18 and is fixed to member 14 in alignment with the lower end of opening 16, so that as the screw 18 is turned the member 14 is raised or lowered with respect to the base 10.

The lower end of screw 18 is mounted within a suitable thrust bearing 22 mounted on standard 10, and has a gear 24 keyed thereto. A pinion meshes with gear 24 and is keyed to a suitable pinion shaft 26, which is mounted within suitable bearings, such as 28, and has a handwheel 30 secured to the outer end thereof. It will thus be evident that by turning the handwheel 30 the screw 18 is correspondingly turned to raise or lower the member 14 for the purpose of vertically adjusting such member with respect to the base 10.

The gear to be formed is indicated at 32 (Figs. 1, 5, 6 and 8) and, in the embodiment illustrated, is an external helical gear, in which the teeth are of involute form. The gear may be formed from either a single blank or from a gear cluster blank, and is mounted upon a mandrel 34 having a shoulder portion 36, which bears against the top face of the gear blank 32. The mandrel 34 extends upwardly above the top of the gear blank 32 and is provided with a plurality of longitudinally extending grooves 38, which are circumferentially spaced about the periphery of the mandrel, so that cooling fluid may flow downwardly over the gear blank and cutters during the cutting operation.

Figures 1, 2:
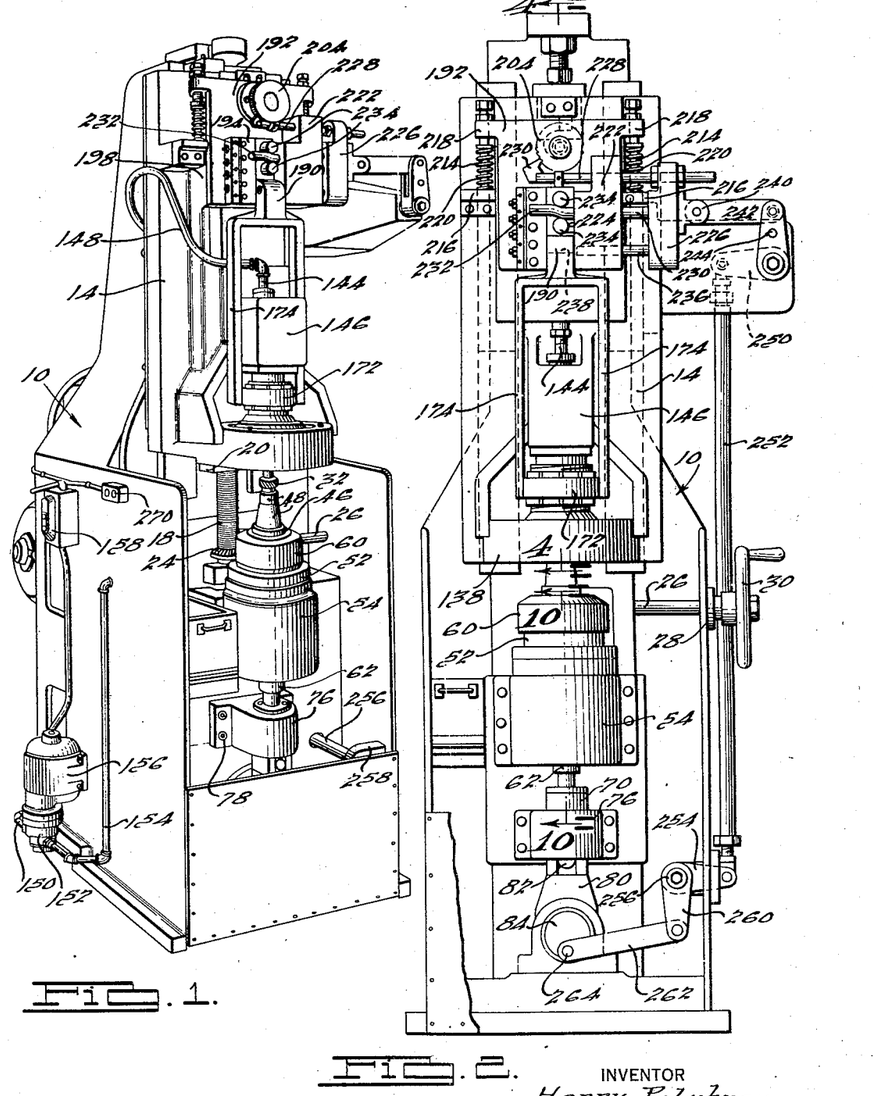
Figure 1 is a perspective view of a gear forming machine according to the present invention.
Fig. 2 is a front elevational view, with parts broken away, of the machine shown in Fig. 1.
Figure 3:
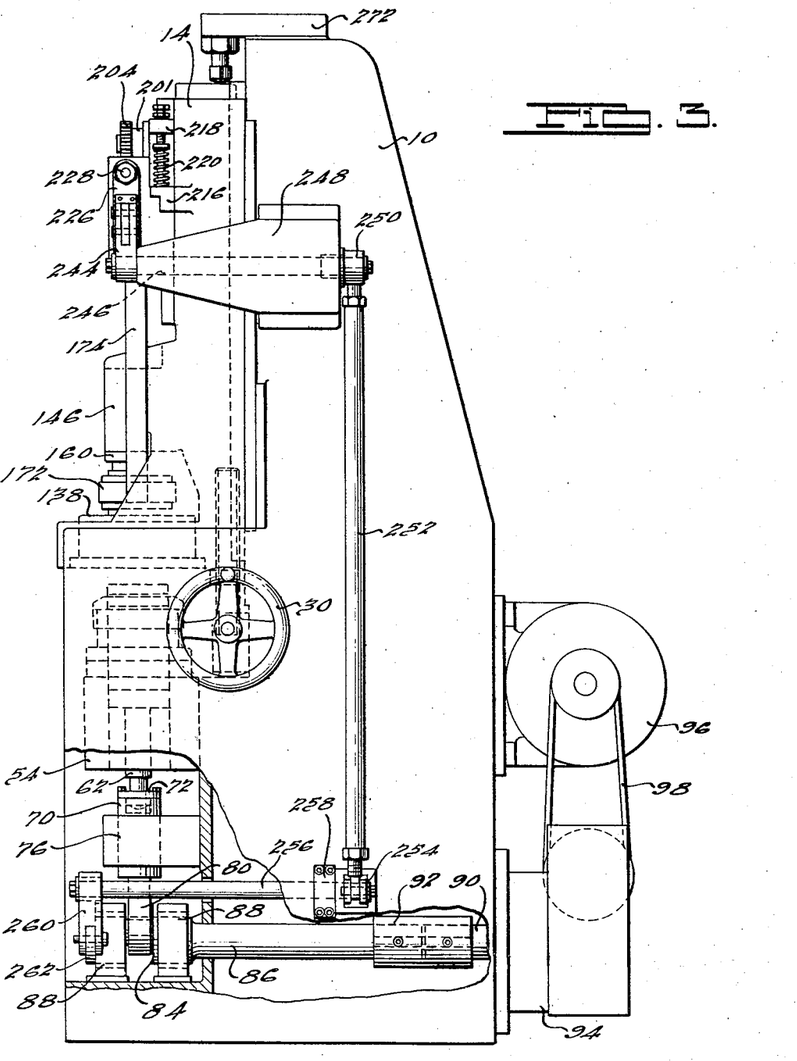
Fig. 3 is a side elevational view of the machine shown in Fig. 2.
Figures 4, 9, 10, 11:
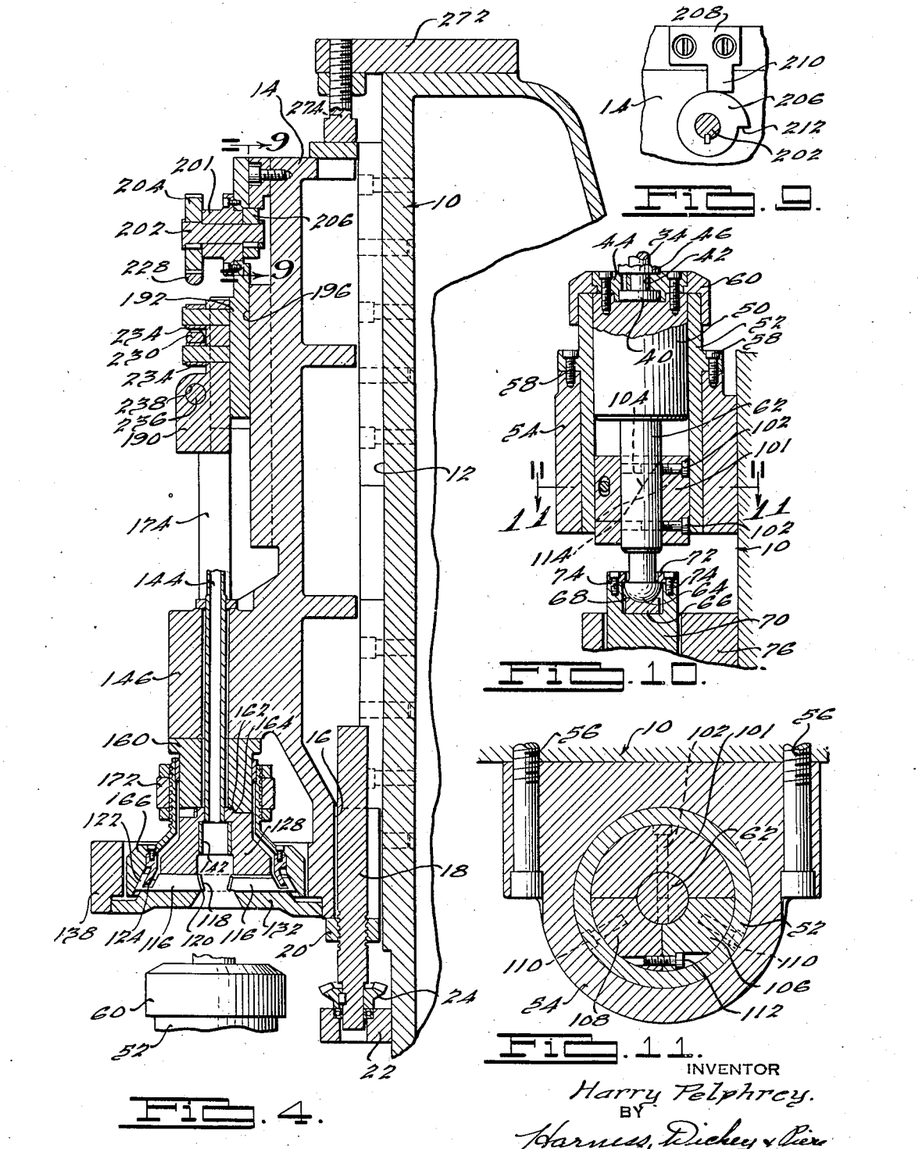
Fig. 4 is a vertical cross-sectional view taken along the line 4—4 of Fig. 2.
Fig. 9 is a fragmentary elevational view, taken substantially along the line 9—9 of Fig. 4.
Fig. 10 is a vertical cross-sectional view, taken substantially along the line 10—10 of Fig. 2.
Fig. 11 is an enlarged cross-sectional view, taken substantially along the line 11—11 of Fig. 10.
Figure 5:
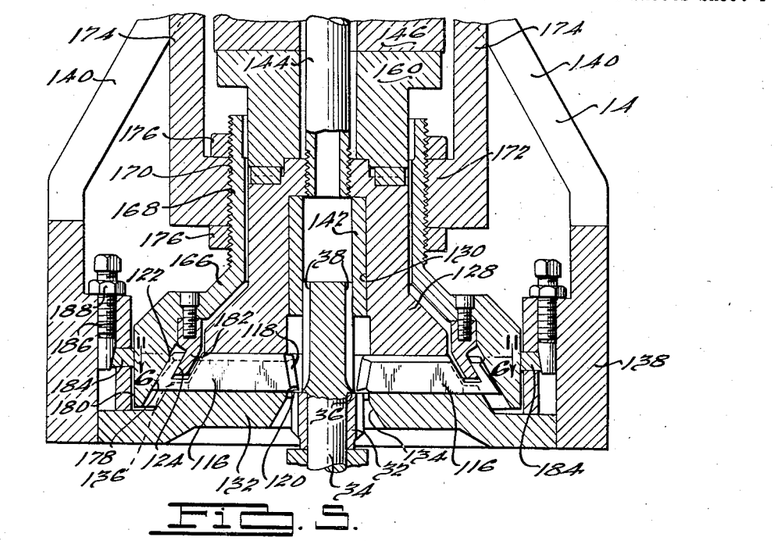
Fig. 5 is an enlarged, vertical cross-sectional view of the cutterhead having the cutters mounted therein, together with the assembly for radially moving the cutters.

The lower end of mandrel 34 (Fig. 10) has an integral and enlarged portion 40, and is received within an aperture 42 of an adapter plate 44. The enlarged, or disc-shaped portion 40 is received within a seat formed in the under surface of plate 44. A clamp ring 46 bears against the top surface of member 44, and spacer members 48 are disposed between the ring 46 and the underside of the gear blank 32, so that the mandrel, with the gear blank 32 mounted thereon, is accurately fixed with respect to the plate 44 and so that the gear blank 32 cannot turn with respect thereto.

The adapter plate 44 is securely fixed to the top surface of a vertically reciprocating and rotating ram 50. Such ram 50 is slidably disposed within the vertical bore of a ram casing 52, which is mounted upon a mounting bracket 54. Such mounting bracket 54 has a vertical bore therethrough, through which a casing 52 extends, and is secured to the standard 10 by means of bolts 56. The casing 52 is secured to the member 54 by means of a plurality of bolts 58.

The ram 50 reciprocates within the casing, and a chip guard 60 is fixedly mounted with respect to the plate 44 and ram 50, so that it reciprocates therewith. The member 60 has a skirt portion which slidably embraces the upper end of casing 52, so that chips cannot fall within the casing.

The ram 50 has a depending, axially aligned stem 62, which terminates in a ball 64. Such ball seats within a ball cup member 66, which is disposed within a recess formed in the upper end of an auxiliary ram member 70. A ball cap in the form of a ring 72 is fixed to the upper end of the auxiliary ram 70 by means of bolts 74, and has an aperture therethrough through which the stem 62 projects with a portion of the member 72 overlying the ball 64. The auxiliary ram 70 is mounted within a crank guide 76, which is mounted to the standard 10 by means of suitable bolts 78.

The lower end of auxiliary ram 70 is connected to a connecting rod 80 by means of a wrist pin 82, and the lower end of the connecting rod 80 is connected to the crank 84 of a crank shaft 86. Such crank shaft is mounted within suitable crank bearings 88 mounted upon standard 10.

The crank shaft 86 is connected to a drive shaft 90 by means of a sleeve 92; and the drive shaft 90 is connected through suitable gear reduction means 94 with a prime mover in the form of an electric motor 96, by means of a belt and pulley arrangement indicated at 98. It will thus be seen that as the prime mover 96 is operated, the crank shaft 86 is rotated to reciprocate the auxiliary ram 70, together with the main ram 50.

As the ram 50, together with the gear blank 32, is reciprocated, it is also turned or rotated with respect to its axis, so that any point on the periphery of the gear blank follows the path of the helix of the gear to be cut. In order to effect such a motion, guide means are provided which include a spiral guide 101, which is fixed to the stem 62 of ram 50 by means of suitable bolts 102. Such rotating guide 101 has a spiral guide surface 104, which has a contour following the helix of the gear to be cut. Complementary spiral guides 106 and 108 are fixed to the casing 52 by means of suitable bolts 110, and are fixed with respect to each other by means of suitable bolts 112. The guides 106 and 108 have a spiral guide surface 114, which cooperates with the guide surface of member 101 to properly guide the ram 50 as it is rotated and reciprocated upon the helix of the gear to be cut.

It will be appreciated that the guide surface may be formed upon the helix of the gear to be cut, which may be predetermined, so that a gear having any helix, within limits of nine inch lead to infinity, may be formed.

In order to form the teeth in the gear blank 32, a plurality of circumferentially spaced, radially disposed cutters 116 are mounted to the head stock element 14 by means of a cutterhead assembly which includes means for controllably feeding the cutters 116 radially inwardly and backing such cutters off with respect to the gear blank. Such means are best shown in Figs. 1 through 9.

The cutters 116 are elongated in form and have a transverse shape which is that of a right angle trapezoid. Each of the cutters 116 has an elongated cutting portion 118 formed along the inner end edge thereof with the cutting edge thereof disposed downwardly, as indicated at 120. In transverse section, the cutting portion has a shape corresponding to the shape of the entire interdental space between the teeth of the gear to be cut. The opposite end edge of the cutter 116 slopes upwardly and inwardly, as indicated at 122, and has a surface formed upon the contour of a cone. A transversely extending slot 124 having the sides thereof substantially parallel to the end 122, but transversely straight, is formed in each of the cutters 116. For a more complete description of the cutters 116, reference may be had to the copending application of Harry Pelphrey, Serial No. 363,329 filed October 29, 1940, in which the cutters per se are disclosed in detail and claimed.

The cutters 116 are mounted within a plurality of complementary, circumferentially spaced, radially disposed slots 126 formed in a cutterhead 128. The cutterhead 128 has a central bore 130 formed therethrough, and is provided with an enlarged bottom, or base portion, within which such slots 126 are formed. The slots 126 are disposed at a predetermined angle with respect to the axis of reciprocation of the ram and such angle is the helix angle of the gear to be cut. The slots in transverse section are in the form of a right angle trapezoid, so that the opposite sides are parallel with each other with the upper end at right angles to such sides and with the lower surface at an acute angle to one of its adjacent sides. Such acute angle is, in the embodiment illustrated, the outside helix angle of the gear to be cut, and is indicated at A in Fig. 7. The outside helix angle is preferred so that the cutters may be made as thin as possible. According to the broader aspects of the invention, such angle could, however, be the helix angle on the pitch or base circles; but in such cases the cutters would necessarily have to be thicker.

Figure 6:
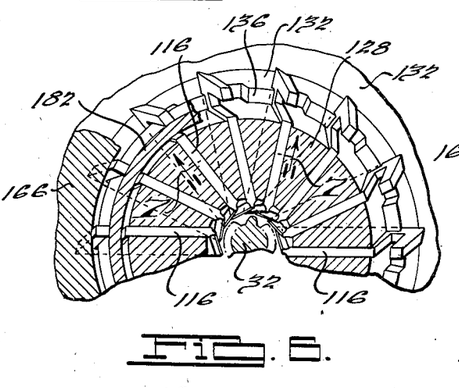
Fig. 6 is a fragmentary cross-sectional view, taken substantially along the line 6—6 of Fig. 5.
Figure 7:
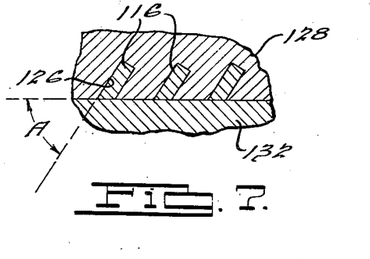
•Fig. 7 is a fragmentary vertical cross-sectional view, taken substantially along the line 7—7 of Fig. 6.
Figure 8:
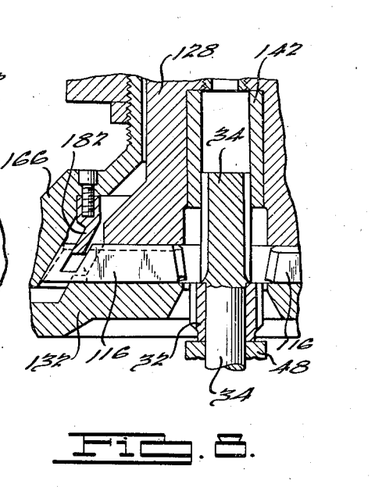
Fig. 8 is a partial view similar to Fig. 5, showing the parts in a different position to retract the cutters with respect to the work.

A head plate 132, having a central opening 134 therethrough, bears against the under surface of cutterhead 128 and also bears against the bottom surface of cutters 116, as best shown in Fig. 7, to fix the cutters against axial displacement with respect to the standard. The plate 132 has a plurality of circumferentially spaced, upwardly extending tabs or projections 136 on the top surface thereof, which are so shaped that the sides thereof bear against the sides of the cutters 116, as best shown in Fig. 6. The plate member 132 is bolted to a forwardly projecting ring-shaped portion 138 which is formed integral with head stock member 14. Vertically extending webs 140 are also formed integral with the ring-shaped portion 138, and with the main body portion of the head stock 14 to reinforce or brace the mounting for the cutterhead.

The arbor 34 projects upwardly within and bears against the inner surface of a bushing 142, which is press fitted within the axial opening 130 through the cutterhead 128.

A head retainer tube 144 has the lower end thereof threadably received within the top of cutterhead 128, and is axially aligned with the opening therethrough. Such tube is mounted upon a forward projection 146, which is formed integral with the head stock 14 and is disposed above portion 138 in spaced relation thereto. The tube 144 has a flexible tube 148 connected thereto, and such tube leads to the outlet 150 of a pump 152 (see Fig. 1), the inlet for such pump communicating through a suitable conduit 154 with a supply of cutting oil. The pump is driven by a suitable motor 156; and it will be appreciated that the cutting oil is thereby supplied tube 144 and flows downwardly through the grooves 48 formed in arbor 34 and flows over the cutters and blank during the cutting operations.

Suitable control means for operating the motor 156 are indicated at 158.

A cutterhead support 160 is provided which has an axially extending opening through which the tube 144 extends; and such member 160 bears against the under surface of the projecting head stock portion 146. The member 160 is provided with a recess 162, which receives a projecting portion 164 of cutterhead 128. The under surface of member 160 is provided with radial slots which receive radial projections formed on the top surface of cutterhead 128, so that there is interlocking engagement between members 160 and 128, so that the cutterhead is fixed against rotation with respect to the axis of reciprocation of the work. The member 160 is bolted to portion 146.

It will thus be seen that the cutters 116 are free to slide radially within grooves 126 with respect to the cutterhead 128 and with respect to the gear blank 32, but are fixed against rotative or axial movement with respect thereto.

Means are provided for controllably feeding the cutters 116 radially inwardly and backing such cutters off with respect to the gear blank 32 in timed relation to the reciprocable and rotary movement of ram 50, which carries gear blank 32 thereon. Such means includes a head cone 166, which is hollow in form and which has a vertical tubular portion 168, which embraces the upper end of the head stock 128. Tubular portion 168 is externally threaded and is disposed within an axially aligned opening 170, formed in the lower ring-shaped portion 172 of feed connection 174.

The member 166 is adjustably fixed with respect to member 174 by means of head adjusting nuts 176 which are threaded to tubular portion 168 and bear against the top and bottom surfaces of ring portion 172. It will thus be seen that by adjusting the nuts 176, the member 166 may be vertically adjusted with respect thereto.

The member 166 has an annular base portion which is formed with an inner conical surface 178 and a vertical peripheral surface 180. A back-off cone 182 is fixedly mounted to the head cone 166 and has a depending portion which is spaced from and substantially parallel to the conical surfaces 178. It will thus be seen that the upwardly projecting tail at the rear end of each of the cutters 116 extends within the space between the conical surface 178 and the outer surface of member 182 so that the back edge 122 of cutters 116 slidably bears against the conical surface 178. The next adjacent edge of slot 124 slidably bears against the outer surface of cone 182.

It will thus be appreciated that by vertically moving the member 166 together with the member 182, that the cutters 116 are radially moved with respect to the cutter head and the work.

The head cone 166 is guided in such vertical movement by means of radially adjustable bearings 184, which may be circumferentially spaced about the member 166 and may be slidably mounted within recesses formed in ring portion 138. The members 184 may be adjusted by means of wedge screws 186, which are threadably received within tapped openings in member 138 and which have wedge portions engaging complementary wedge portions formed on members 184. Lock nuts 188 may be provided for fixing the wedge screws 186 so as to maintain alignment of member 166 during its vertical up and down movement.

The vertical movement of member 166 is effected by vertically moving the feed connections 174. Such feed connection 174 is in general a rectangular frame element having a pair of spaced and vertical sides which are integral with the annular portion 172 adjacent the bottom thereof, and which are connected at the top by a cross member having an integral upwardly extending portion 190.

The portion 190 forms a back-off connection which is slidably mounted for vertical movement upon the front face of a feed plate 192. The member 190 may be so slidably mounted by means of vertically extending gibs 194 which are fixed to the plate 192 and form ways within which the member 190 slides. The feed plate 192 is also mounted for vertical sliding movement on the front face 196 of head stock member 14; and such member is slidably fixed with respect thereto by means of vertically disposed gibs 198, which are fixed to the member 14 and form ways within which the member 192 slides. It will thus be seen that the plate 192 is vertically and slidably disposed with respect to member 14, and that the back-off plate 190 is vertically and slidably disposed with respect to the feed plate 192.

By moving the plate 192 downwardly in timed relation to the reciprocable movement of the ram 50, it will be seen that the member 166 is correspondingly moved downwardly, and that the cutters 116 are fed radially inwardly. Means are provided for effecting such downward movement, and means are also provided for effecting upward movement of the back-off plate 190 with respect to the plate 192 alternately with the down feed of plate 192 so that the cutters 116 are first fed radially inwardly by the downward movement of plate 192 and are alternately backed off in outward radial movement by upward movement of back-off plate 190. During cutting engagement of the cutters 116 with the blank 32, the back-off plate 190 is locked in its position with respect to plate 192.

To accomplish these movements, a cam shaft holder 201 is fixedly secured to the front face of member 192 adjacent the top thereof and is provided with a bore for the reception of a cam shaft 202. A feed mechanism ratchet wheel 204 is keyed to the forwardly projecting end of shaft 202; and a cam 206 is keyed to the inwardly projecting end of shaft 202. A cam follower 208 is fixedly connected to the upper end of member 14 and is so disposed that the follower portion 210 thereof bears against the cam surface of cam 206. It will thus be seen that as the ratchet wheel 204 is rotated, the cam 206 is correspondingly turned so that the plate 192 is moved downwardly with respect to member 14. The cam 206 is so shaped as to provide the desired rate of downward feed, and at the end of one complete revolution it will be appreciated that the follower 210 passes beyond cam portion 212 so that the plate 192 may be returned to its uppermost position. The cam is so designed that for one complete revolution thereof a complete gear is formed, so that all of the interdental space between the teeth to be cut is removed.

Means are provided for resiliently urging the plate 192 upwardly so that the cam 206 and cam follower 210 are in constant engagement with each other. Such means include a pair of oppositely disposed bolts 214, which are fixed to supporting brackets 216 fixedly secured to the front face of member 14. Such bolts 214 are slidably received through openings formed in side projections 218 formed integral with plate member 192; and compression springs 220 are disposed between brackets 216 and projections 218 so that the plate member 192 is resiliently urged upwardly. It will thus be seen that at the completion of one cycle, when the follower 210 passes beyond cam portion 212, the plate member 192 is returned to its uppermost position by means of the compression springs 220.

A feed cross head guide 222 is fixedly secured to the front face of member 192 and has a vertical side face 224 against which an adjacent side of plate member 190 slidably bears. A cross head 226 is slidably mounted with respect to the guide 222. A feed ratchet rod 228, having a pawl 230 mounted on one end thereof, is slidably received through an opening formed in guide 222 and is adjustably fixed to the upper end of cross head 226. A back-off cam rod 230 is fixedly connected to the crosshead 226 and is slidably received within a guide opening formed in guide 222. The projecting end of rod 222 is upwardly offset, as indicated at 232, to provide back off cam surfaces. The top and bottom surfaces of such projection are flattened and are engaged on both sides by back off rolls 234, which are mounted upon studs and fixed to member 190. A feed locking rod 236 is fixed to the cross head 226 and is slidably received within a guide opening formed in guide 222. A transverse opening 238 is formed in member 190 and is adapted to be aligned with the opening 222 through which the rod 236 passes when the slide 190 is in one predetermined position, so that the lock rod 236 may pass into such opening 238 and lock the member 190 with respect to member 192. It will thus be appreciated that as the cross head 226 is moved to the right (viewing Fig. 2), the pawl 230 engages one of the notches in the ratchet wheel 204, so that such ratchet wheel is turned counterclockwise, thereby moving the feed slide 192 downwardly through action of cam 206. As the cross head 226 is moved to the left (viewing Fig. 2), the cam surfaces of offset portion 232, through engagement with rollers 234, cause the slide 190 to move downwardly with respect to plate 192, so that opening 238 is aligned with rod 236 and passage of such rod into the opening locks the member 190 with respect to the slide plate 192, thereby locking these plates during the cutting period. Movement of the cross head 226 to the right releases such locking engagement and causes the slide plate 190 to move upwardly by the action of offset portion 232, so that the cutters are backed off from engagement with the work.

The reciprocable movement of the crosshead 226 is effected in timed relation with the reciprocation of ram 50, so that during upward movement of the ram the members 1390 and 192 are locked with respect to each other, and at the end of such vertical reciprocation the cutters are backed off from their innermost position so that as the ram is moved downwardly the cutters do not engage the stock, and at the end of such downward movement the ratchet wheel 204 is turned so as to effect inward radial feed of the cutters for the next succeeding cut. It will thus be seen that the cutters are fed inwardly step by step, and alternately backed off so that all of the teeth of the gear are completely formed for one complete revolution of the cam 206. It will be appreciated that by adjusting rod 228, that the feed may be varied.

The means for operating the crosshead in timed relation to the reciprocation of the ram includes a crosshead tongue 240 which is fixed to the crosshead 226 and which has a link 242 pivotally connected thereto. The opposite end of the link is pivotally connected to one end of a lever arm 244; and the opposite end of such lever arm is keyed to a shaft 246. Such shaft 246 is rotatably mounted within a feed bracket 248, which is mounted upon standard 10. The opposite end of such shaft 246 is fixedly connected to a lever 250. The opposite end of such lever 250 is pivotally connected to an upwardly extending feed mechanism link 252, which is so constructed that it is adjustable as to length. The lower end of link 252 is pivotally connected to one end of a lever 254; and the opposite end of such lever 254 is fixedly connected to a feed mechanism shaft 256. Such shaft 256 is mounted within suitable bearing brackets 258, which may be fixed to the standard 10. The opposite end of the shaft is keyed to one end of a lever arm 260, and the lower end of such lever arm is pivotally connected to a link 262. The opposite end of the crank link 262 is pivotally connected through a pivot pin 264 with one end of crank 84. Such pin 264 is located off-center from the center of crank 84, and has a predetermined position with respect to the rotative position of the crank so that the crosshead 226 is moved to the right or left in the desired sequence with respect to the reciprocation of the ram.

Suitable control mechanism, such as that generally indicated at 270, may be mounted at a convenient location for starting and stopping the motor 96 for the purpose of operating the machine.

In the operation of the machine, the member 14 may be moved vertically upwardly through hand wheel 30, so that the arbor 34, with the machine element or gear blank 32 mounted thereon, may be mounted on the ram. The member 14 may then be lowered to a predetermined starting position by hand wheel 30. Back-up plate 272, having a vertically adjustable bolt 274, is disposed above member 14, and the bolt 274 may then be positioned to bear against the top of member 14 to reinforce or back it up.

The motor 96 may then be started so that the ram is reciprocated vertically and guided by the helical guides to move the blank toward and from the cutters 116. As mentioned above, the cutters are radially fed inwardly step by step and alternately backed off in timed relation to the reciprocation of the ram through the feed mechanism, which is connected to the ram operating means.

Formal changes may be made in the specific embodiment of the invention described without departing from the spirit and substance of the invention, the scope of which is commensurate with the appended claims.

What is claimed is:

1. A machine for forming simultaneously a plurality of teeth in a machine element comprising a standard, a work holder, means mounting said holder for reciprocatory movement with respect to said standard, a mounting member mounted on said standard to one side of said holder, a feed plate mounted for sliding movement with respect to said member toward and away from said holder, a back-off plate slidably mounted with respect to said feed plate, a cutter head having a plurality of radially disposed cutters mounted thereon for radial movement with respect thereto, means connecting said cutters to said back-off plate for moving said cutters radially with respect to said head upon movement of said back-off plate and said feed plate, and means for moving said feed plate and said back-off plate in timed relation to the reciprocatory movement of said work holder.

2. A machine for forming simultaneously a plurality of teeth in a machine element comprising a standard, a work holder, means mounting said holder for reciprocatory movement with respect to said standard, a mounting member mounted on said standard to one side of said holder, a feed plate mounted for sliding movement with respect to said member toward and away from said holder, a back-off plate slidably mounted with respect to said feed plate, a cutter head having a plurality of radially disposed cutters mounted thereon, said cutters being mounted for radial movement into and out of cutting engagement with the work mounted on said holder, means connecting said cutters to said back-off plate for moving said cutters radially with respect to said head upon movement of said back-off plate and said feed plate, means for moving said feed plate in timed relation to the reciprocatory movement of said work holder, means for locking said back-off plate with respect to said feed plate during cutting engagement of said cutters with said work, and means for moving said back-off plate separately of said feed plate in timed relation to the reciprocatory movement of said work holder.

3. In a machine for forming simultaneously a plurality of teeth in a machine element in which a reciprocatory work holder moves the work toward and from a plurality of circumferentially spaced radially disposed cutters, the combination with means for progressively feeding said cutters inwardly toward said element and alternately backing off said cutters from said element, said last named means including a pair of cone-shaped elements fixed in spaced relation to each other and engaging said cutters, means axially fixing the position of said cutters but permitting radial movement thereof, an axially movable feed plate, an axially movable back-off plate mounted on said feed plate, means connecting said back-off plate to said cone elements, releasable means fixing said back-off plate with respect to said feed plate so that said back-off plate may be axially moved separately from movement of said feed plate or said back-off plate and feed plate may be moved in unison to thereby move said cone-shaped members axially to move said cutters radially outwardly or inwardly, and means for moving said feed plate and said back-off plate in timed relation to the reciprocatory movement of said work holder.

4. In a machine for forming simultaneously a plurality of teeth in a machine element in which a reciprocatory work holder moves the work toward and from a plurality of circumferentially spaced radially disposed cutters, the combination with means for progressively feeding said cutters inwardly toward said element and alternately backing off said cutters from said element, said last named means including a pair of cone-shaped elements fixed in spaced relation to each other and engaging said cutters, means axially fixing the position of said cutters but permitting radial movement thereof, an axially movable feed plate, an axially movable back-off plate mounted on said feed plate, means connecting said back-off plate to said cone elements, releasable means fixing said back-off plate with respect to said feed plate so that said back-off plate may be axially moved separately from movement of said feed plate or said back-off plate and feed plate may be moved in unison to thereby move said cone-shaped members axially to move said cutters radially outwardly or inwardly, and means for moving said feed plate and said back-off plate in timed relation to the reciprocatory movement of said work holder, and means for bodily, axially moving said cutters, said cone-shaped members, said back-off plate and said feed plate with respect to said work holder.

5. A machine for forming simultaneously a plurality of teeth in a machine element comprising an upright standard, a work holder, means mounting said work holder for vertical reciprocatory movement with respect to said standard, a mounting member mounted on said standard above said holder, a feed plate mounted for sliding movement with respect to said member toward and away from said holder, a back-off plate slidably mounted with respect to said feed plate toward and away from said holder, a cutter head fixably mounted on said member, said cutter head having a plurality of radially disposed cutters mounted thereon, said cutters being fixed against axial movement with respect to said cutter head but being mounted for radial movement with respect thereto for movement into and out of cutting engagement with the work mounted on said work holder, means connecting said cutters to said back-off plate for moving said cutters radially with respect to said head upon movement of said back-off plate and said feed plate, means for moving said feed plate in timed relation to the reciprocatory movement of said work holder, means for locking said back-off plate with respect to said feed plate during engagement of said cutters with said work, and means for moving said back-off plate separately from said feed plate in timed relation to the reciprocatory movement of said work holder.

6. A machine for forming simultaneously a plurality of teeth in a machine element comprising a standard, a work holder, means mounting said holder for reciprocatory movement with respect to said standard, a mounting member mounted on said standard to one side of said holder, a feed plate mounted for sliding movement with respect to said member for movement toward and away from said holder, a back-off plate slidably mounted with respect to said feed plate mounted for movement toward and away from said holder, a cutter head fixed to said member, said cutter head having a plurality of circumferentially spaced, radially disposed slots therein, the side walls of each of said slots being substantially parallel to each other and being disposed at a predetermined angle to the axis of movement of said work holder, a cutter disposed in each of said slots, means fixing said cutters against axial movement with respect to said cutter head but permitting radial movement with respect thereto for movement into and out of engagement with the work mounted on the work holder, and means for feeding said cutters radially inwardly and outwardly with respect to said element.

7. A machine for forming simultaneously a plurality of teeth in a machine element comprising a standard, a work holder, means mounting said holder for reciprocatory movement with respect to said standard, a mounting member mounted on said standard to one side of said holder, a feed plate mounted for sliding movement with respect to said member for movement toward and away from said holder, a back-off plate slidably mounted with respect to said feed plate mounted for movement toward and away from said holder, a cutter head fixedly mounted to said member, said cutter head having a plurality of circumferentially spaced, radially disposed slots therein, the side walls of each of said slots being substantially parallel to each other and being disposed at a predetermined angle to the axis of movement of said work holder, a cutter disposed in each of said slots, means fixing said cutters against axial movement with respect to said cutter head but permitting radial movement with respect thereto for movement into and out of engagement with the work mounted on the work holder, means connecting said cutters to said back-off plate for moving said cutters radially with respect to said head upon movement of said back-off plate and said feed plate, means for moving said feed plate in timed relation to the reciprocatory movement of said work holder, and means for moving said back-off plate separately from said feed plate in timed relation to the reciprocatory movement of said work holder.

8. A machine for forming simultaneously a plurality of teeth in a machine element comprising a standard, a work holder, means mounting said holder for reciprocatory movement with respect to said standard, a mounting member mounted on said standard to one side of said holder, a feed plate mounted for sliding movement with respect to said member for movement toward and away from said holder, a back-off plate slidably mounted with respect to said feed plate mounted toward and away from said holder, a cutter head fixedly mounted to said member, said cutter head having a plurality of circumferentially spaced, radially disposed slots therein, the side walls of each of said slots being substantially parallel to each other and being disposed at a predetermined angle to the axis of movement of said work holder, a cutter disposed in each of said slots, means fixing said cutters against axial movement with respect to said cutter head but permitting radial movement with respect thereto for movement into and out of engagement with the work mounted on the work holder, and common means for reciprocating said work holder and for moving said feed plate and said back-off plate so that said cutters are moved into and out of engagement with said element in a predetermined sequence.

9. A machine for forming simultaneously a plurality of teeth in a machine element, comprising a standard, a work holder, means mounting said work holder for reciprocatory movement with respect to said standard, a mounting member mounted on said standard to one side of said holder, a feed plate mounted for sliding movement with respect to said member for movement toward and away from said holder, a back-off plate slidably mounted with respect to said feed plate for movement toward and away from said holder, a cutter head fixedly mounted on said member, said cutter head being provided with a plurality of circumferentially spaced, radially disposed slots therein at one end thereof, a cutter disposed within each of said slots, an annular member mounted on said mounting member and engaging said cutter head adjacent said cutters to hold said cutters against axial movement with respect to said cutter head but permitting radial movement with respect thereto, means connecting said cutters to said back-off plate for moving said cutters radially with respect to said head upon movement of said back-off plate and said feed plate, means for moving said feed plate in timed relation to the reciprocatory movement of said work holder, and means for moving said back-off plate separately from said feed plate in timed relation to the reciprocatory movement of said work holder.

10. A machine for forming simultaneously a plurality of teeth in a machine element, comprising a standard, a work holder, means mounting said work holder for reciprocatory movement with respect to said standard, a mounting member mounted on said standard to one side of said work holder, a feed plate mounted for sliding movement with respect to said member for movement toward and away from said holder, a back-off plate slidably mounted with respect to said feed plate for movement toward and away from said holder, a cutter head fixedly mounted on said member, said cutter head being provided with a plurality of circumferentially spaced radially disposed slots therein at one end thereof, a cutter disposed within each of said slots, an annular member mounted on said mounting member and engaging said cutter head adjacent said cutters to hold said cutters against axial movement with respect to said cutter head but permitting radial movement with respect thereto, means connecting said cutters to said back-off plate for moving said cutters radially with respect to said head upon movement of said back-off plate and said feed plate, means for moving said feed plate in timed relation to the reciprocatory movement of said work holder, and means for locking said back-off plate with respect to said feed plate during engagement of said cutters with said work.

11. A machine for forming simultaneously a plurality of teeth in a machine element comprising a standard, a work holder, a means mounting said work holder for reciprocatory movement with respect to said standard, a mounting member mounted on said standard to one side of said holder, a feed plate mounted for sliding movement with respect to said member for movement toward and away from said holder, a cutter head fixedly mounted on said member, said cutter head having a plurality of radially disposed cutters mounted thereon, said cutters being fixed against axial movement with respect to said cutter head but being mounted for radial movement with respect thereto for movement into and out of cutting engagement with the work mounted on the work holder, means connecting said cutters to said feed plate for moving said cutters radially with respect to said head upon movement of said feed plate, and means for moving said feed plate in timed relation to the reciprocatory movement of said work holder.

12. A machine for forming simultaneously a plurality of teeth in a machine element comprising a standard, a work holder, means mounting said work holder for reciprocatory movement with respect to said standard, a mounting member mounted on said standard to one side of said holder, a feed plate mounted for sliding movement with respect to said member for movement toward and away from said holder, a cutter head fixedly mounted on said member, said cutter head having a plurality of radially disposed cutters mounted thereon, said cutters being fixed against axial movement of said cutter head but being mounted for radial movement with respect thereto for movement into and out of cutting engagement with the work mounted on the work holder, means connecting said cutters to said feed plate for moving said cutters radially with respect to said head upon movement of said feed plate, means for moving said feed plate in timed relation to the reciprocatory movement of said work holder, said last named means including a cam member mounted on said feed plate and engaging said mounting member, and means for indexing said cam in timed relation to the reciprocatory movement of said work holder, so that said feed plate is moved towards said work holder a predetermined amount for each cycle of reciprocation of said work holder.

13. A machine for forming simultaneously a plurality of teeth in a machine element comprising a standard, a work holder, means mounting said work holder for reciprocatory movement with respect to said standard, a mounting member mounted on said standard to one side of said holder, a feed plate mounted for sliding movement with respect to said member for movement toward and away from said holder, a back-off plate slidably mounted with respect to said feed plate for movement toward and away from said holder, a cutter head fixedly mounted on said member, said cutter head having a plurality of radially disposed cutters mounted thereon, said cutters being fixed against axial movement with respect to said cutter head but being mounted for radial movement with respect thereto for movement into and out of cutting engagement with the work mounted on the work holder, means connecting said cutters to said feed plate for moving said cutters radially with respect to said head upon movement of said feed plate, means for moving said feed plate in timed relation to the reciprocatory movement of said work holder, said last named means including a cam member mounted on said feed plate and engaging said mounting member, and means for indexing said cam in timed relation to the reciprocatory movement of said work holder, so that said feed plate is moved towards said work holder a predetermined amount for each cycle of reciprocation of said work holder.

14. A machine for forming simultaneously a plurality of teeth in a machine element comprising a standard, a work holder, means mounting said holder for reciprocatory movement with respect to said standard, a mounting member mounted on said standard to one side of said holder, a feed plate mounted for sliding movement with respect to said member for movement toward and away from said holder, a back-off plate slidably mounted with respect to said feed plate mounted for movement toward and away from said holder, a cutter head fixed to said member, said cutter head having a plurality of circumferentially spaced, radially disposed slots therein, the side walls of each of said slots being disposed at a predetermined angle to the axis of movement of said work holder, said angle being dependent upon the outside helix angle of the teeth to be cut in the machine element, a cutter disposed in each of said slots, means fixing said cutters against axial movement with respect to said cutter head but permitting radial movement with respect thereto for movement into and out of engagement with the work mounted on the work holder, and means for feeding said cutters radially inwardly and outwardly with respect to said element.

15. A machine for forming simultaneously a plurality of teeth in a machine element comprising a standard, a work holder, means mounting said holder for reciprocatory movement with respect to said standard, a mounting member mounted on said standard to one side of said holder, a feed plate mounted for sliding movement with respect to said member for movement toward and away from said holder, a back-off plate slidably mounted with respect to said feed plate mounted for movement toward and away from said holder, a cutter head fixed to said member, said cutter head having a plurality of circumferentially spaced, radially disposed slots therein, the side walls of each of said slots being disposed at a predetermined angle to the axis of movement of said work holder, said angle being substantially the same as the outside helix angle of the teeth to be cut in the machine element, a cutter disposed in each of said slots, means fixing said cutters against axial movement with respect to said cutter head but permitting radial movement with respect thereto for movement into and out of engagement with the work mounted on the work holder, and means for feeding said cutters radially inwardly and outwardly with respect to said element.

16. A cutter head body for use in a machine for forming simultaneously a plurality of teeth in a machine element comprising a member having a central axial opening therethrough, a plurality of circumferentially spaced, substantially radially disposed slots formed in one end thereof and directed toward said central opening, the side walls of each of said slots being substantially parallel to each other and being disposed at an angle with respect to said axis, said angle being the outside helix angle of the teeth to be formed on said machine element.

HARRY PELPHREY.